Patented July 11, 1950

2,514,546

UNITED STATES PATENT OFFICE 2,514,546

PRODUCTION OF CYCLOALKYLPERHYDRO-INDAN HYDROCARBONS

Vladimir N. Ipatieff and Herman Pines, Chicago, Ill., assignors to Universal Oil Products Company, Chicago, Ill., a corporation of Delaware No Drawing. Application January 30, 1948, Serial No. 5,517

16 Claims. (Cl. 260—666)

This invention relates to a process for producing cycloalkylperhydroindan hydrocarbons, particularly 1,3,3,6-tetramethyl - 1 - (4-methylcyclohexyl)-hexahydroindan, and to cycloalkylperhydroindan hydrocarbons as new compositions of matter.

An object of this invention is a cycloalkylperhydroindan hydrocarbon.

Another object of this invention is 1,3,3,6-tetramethyl-1-(4-methylcyclohexyl)-hexahydroindan.

Further objects of this invention are methods for producing cycloalkylperhydroindan hydrocarbons.

One specific embodiment of this invention relates to a process for producing a cycloalkylperhydroindan hydrocarbon which comprises effecting a hydrogen transfer reaction in the presence of an acid-acting catalyst between a branched chain olefin and a para-disubstituted aromatic hydrocarbon having as one substituent a hydrocarbon group containing only one hydrogen atom joined to the carbon atom combined with the aromatic ring to form an arylindan hydrocarbon, and hydrogenating said arylindan hydrocarbon to a cycloalkylperhydroindan hydrocarbon.

Another embodiment of this invention relates to a process for producing a cyclohexylperhydroindan hydrocarbon which comprises effecting a hydrogen transfer reaction in the presence of an acid-acting catalyst between a branched chain olefin and a para-disubstituted benzene hydrocarbon having as one substituent a hydrocarbon group containing only one hydrogen atom joined to the carbon atom combined with the benzene ring to form a phenylindan hydrocarbon, and hydrogenating said phenylindan hydrocarbon to a cyclohexylperhydroindan hydrocarbon.

A further embodiment of this invention relates to a cycloalkylperhydroindan hydrocarbon as a new composition of matter.

A still further embodiment of this invention relates to a cyclohexylperhydroindan hydrocarbon as a new composition of matter.

We have developed a method for producing cycloalkylperhydroindan hydrocarbons by a combination of hydrogen transfer and hydrogenation reactions. The hydrogen transfer reaction is effected in the presence of an acid-acting catalyst between a branched chain olefin and an aromatic hydrocarbon containing at least two and not more than five hydrocarbon substituents with two of said substituents in para position. One of said para-substituents contains at least three carbon atoms and also has a hydrogen atom combined with the carbon atom that is joined to the aromatic ring. The reaction is illustrated by the following equation wherein $x$ is selected from 0 and the small even numbers 2, 4, etc., R represents a member of the group consisting of alkyl and cycloalkyl groups and each of $R_1$ to $R_4$ represents a member of the group consisting of hydrogen, an alkyl group and a cycloalkyl group.

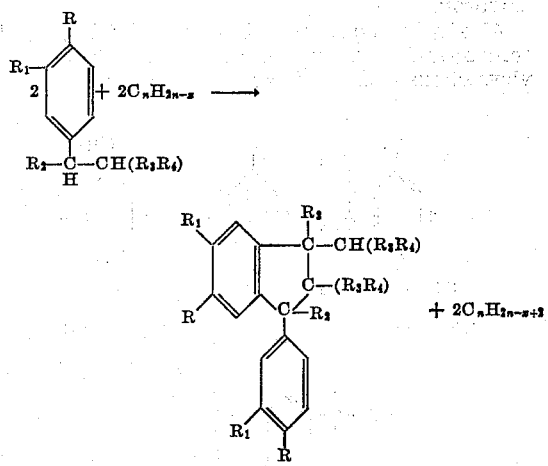

Hydrogenation of the resultant arylindan hydrocarbon produces a cycloalkylperhydroindan hydrocarbon which may be represented by the formula:

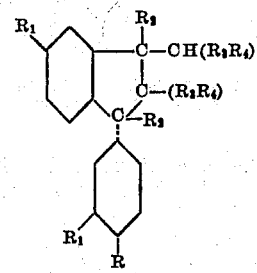

wherein each of R and R₁ to R₄ represents the same groups indicated for the arylindan hydrocarbons.

Similarly, the production of 1,3,3,6-tetramethyl-1-p-tolylindan from p-cymene and 2-methyl-2-butene is indicated by the equation:

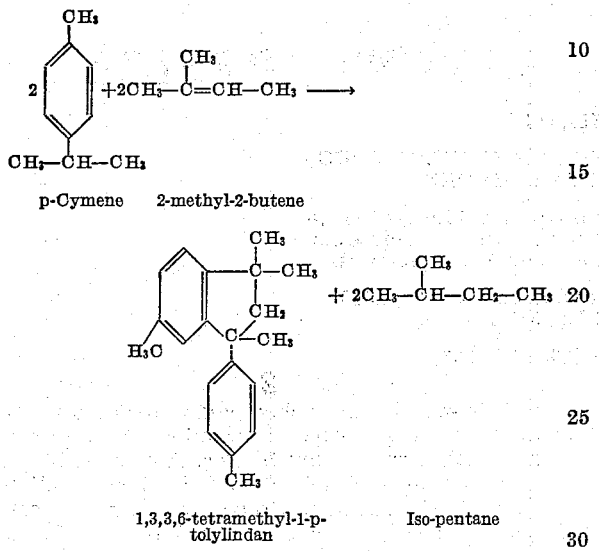

p-Cymene   2-methyl-2-butene 1,3,3,6-tetramethyl-1-p-   Iso-pentane
tolylindan

Also hydrogen transfer between p-cymene and methylcyclohexene yields 1,3,3,6-tetramethyl-1-p-tolylindan and methylcyclohexane.

Hydrogenation of 1,3,3,6 - tetramethyl - 1 - p - tolylindan in the presence of a nickel catalyst or other active hydrogenation catalyst produces 1,3,3,6-tetramethyl-1-(4-methylcyclohexyl)-hexahydronindan.

Also hydrogen transfer between 2,4-diisopropyltoluene and a branched chain olefin such as methylcyclohexene proceeds according to the equation:

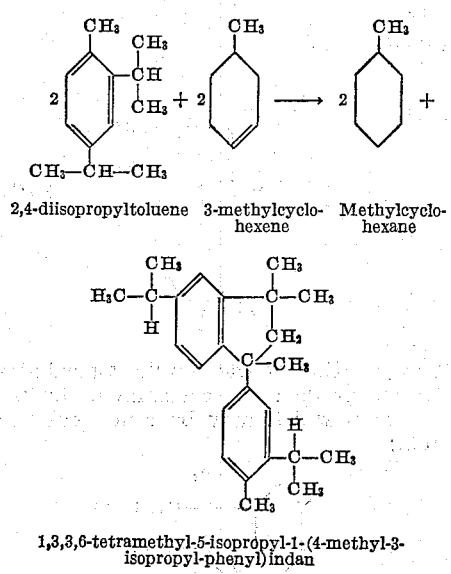

2,4-diisopropyltoluene   3-methylcyclo-   Methylcyclo-
                         hexene           hexane 1,3,3,6-tetramethyl-5-isopropyl-1-(4-methyl-3-
isopropyl-phenyl)indan Catalytic hydrogenation of the indan hydrocarbon produced by the foregoing reaction forms 1,3,3,6-tetramethyl-5-isopropyl - 1 - (4-methyl-3-isopropylcyclohexyl)-hexahydroindan.

Also hydrogen transfer between 4-isopropyl-2-cyclohexyltoluene and methylcyclohexene takes place to yield the products indicated by the following equation:

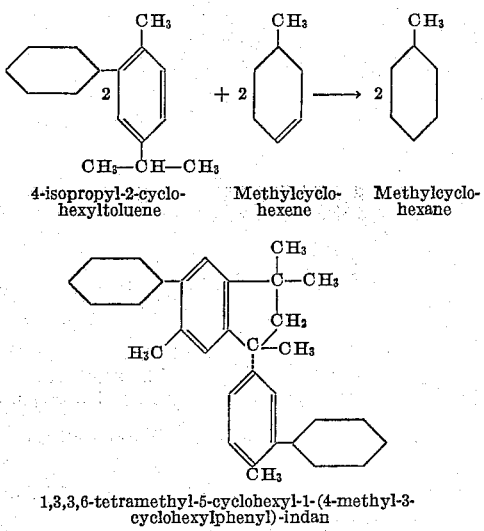

4-isopropyl-2-cyclo-   Methylcyclo-   Methylcyclo-
hexyltoluene           hexene         hexane 1,3,3,6-tetramethyl-5-cyclohexyl-1-(4-methyl-3-
cyclohexylphenyl)-indan Catalytic hydrogenation of this indan hydrocarbon produces 1,3,3,6 - tetramethyl - 5 - cyclohexyl - 1 - (4 - methyl - dicyclohexyl) - hexahydroindan.

Aromatic hydrocarbons used in our synthesis of indan hydrocarbons by hydrogen transfer reaction contain at least one para-arrangement of hydrocarbon group substituents in order to take part in this hydrogen transfer reaction. Also one of the substituents in the para-arrangement must have only one hydrogen atom combined with the carbon atom attached to the benzene ring. Accordingly, this hydrocarbon substituent which contains the tertiary hydrogen atom also contains at least three carbon atoms. Such aromatic hydrocarbons which are useful as starting material for the process have the structures represented by the formula:

$$\begin{array}{c} R_2 \\ R_1-\text{\Large\Phi}- \\ R_4-\underset{H}{\overset{|}{C}}-R_3 \end{array}$$

wherein R represents a member selected from the group consisting of a hydrogen atom, an alkyl radical, a cycloalkalkyl radical, and a cycloalkyl radical, and each of $R_2$, $R_3$ and $R_4$ is selected from the group consisting of an alkyl radical, a cycloalkalkyl radical, a cycloalkyl radical, and a bicycloalkyl radical. The combination of the different R groups should be balanced so as to avoid steric hindrance. Also aromatic hydrocarbons and particularly benzene hydrocarbons containing more than three hydrocarbon substituent groups may also be present in a starting material provided that such a hydrocarbon has a replaceable hydrogen atom combined with a nuclear carbon atom adjacent to the carbon atom which is combined with the group:

$$R_4-\underset{H}{\overset{|}{C}}-R_3$$

Such aromatic starting materials include p-cymene, 1,2-dimethyl-4-isopropylbenzene, 2,4-diisopropyltoluene, 4-isopropyl-2-cyclohexyltoluene, etc.

Olefinic starting materials suitable for this hydrogen transfer process have branched chains and include such hydrocarbons as trimethylethylene, dihydrolimonene, methylcyclohexene, 1,1,3-trimethylcyclohexene, menthene, etc. The exact type of olefin to be used is dependent on the catalyst and the aromatic hydrocarbon with which the hydrogen transfer is to be effected. Thus n-octene and cyclohexene, namely, olefins not possessing branched chains, when reacted with a para-dialkyl aromatic hydrocarbon at operating conditions similar to those used with the branched chain olefins, effect alkylation but not hydrogen transfer.

In addition to the branched chain monoolefins mentioned above, other olefin-acting compounds which are also utilizable in this process comprise conjugated diolefins containing a tertiary carbon atom and alcohols, ethers, esters of carboxylic acids, and alkyl halides which may be regarded as capable of forming branched chain olefins in situ in the reaction mixture.

The process as herein described is carried out in the presence of an acid-acting catalyst at conditions necessary for the hydrogen transfer reaction. Suitable acid-acting catalysts include mineral acids, such as sulfuric acid, chlorosulfonic acid, fluorosulfonic acid, hydrogen fluoride, hydroxyborofluoric acids, fluorophosphoric acids, phosphoric acids; Friedel-Crafts halide catalysts, particularly aluminum chloride, aluminum bromide, ferric chloride, zirconium chloride; and boron fluoride. Since in some cases, Friedel-Crafts catalysts may cause an alkyl migration within the aromatic ring before the hydrogen transfer reaction occurs, it is sometimes advantageous to use Friedel-Crafts complexes, such as etherate, alcoholate, etc. for this reaction.

Phosphoric acid catalysts comprise orthophosphoric acid, triphosphoric acid, and tetraphosphoric acid. Under certain conditions of operation, various acid-acting oxide-type catalysts may be used which include activated clays, silica-alumina composites, and other silica-containing materials which are generally utilizable as catalysts for hydrocarbon cracking.

The operating conditions used in the hydrogen transfer step of this process are dependent upon the nature of the hydrocarbons being treated and also upon the catalysts employed. When utilizing strong mineral acids, such as hydrogen fluoride, sulfuric acid, fluorosulfonic acid, chlorosulfonic acid, and the like, and also Friedel-Crafts metal halides promoted by a hydrogen halide such as hydrogen chloride, the process is carried out at a temperature of from about −30° to about 100° C. and at a pressure up to about 100 atmospheres. However, in the presence of hydrogen fluoride, sulfuric acid, and aluminum chloride catalysts the preferred operating temperature is generally from about 0° to about 50° C., while in contact with ferric chloride catalysts the preferred operating temperature is from about 50° to about 100° C. Silica-alumina and other synthetic oxide catalysts and clays are generally used at a temperature of from about 200° to about 400° C., and at a superatmospheric pressure generally not in excess of about 100 atmospheres.

The hydrogen transfer reaction is carried out in either batch or continuous type of operation. In batch-type operation the usual procedure consists in placing a mineral acid or Friedel-Crafts catalyst and a portion, generally about 50%, of the aromatic hydrocarbon in a reactor provided with a mechanically driven stirrer, cooling these materials to a temperature of from about 0° to about 10° C., and adding thereto with stirring, a solution of the olefin in the remainder of the aromatic hydrocarbon. The reaction mixture is then separated and the product is washed, dried, and distilled to separate therefrom the indan hydrocarbons. Unconverted aromatic hydrocarbons recovered in this distillation are utilizable in the further operation of the process.

The process is also carried out in a continuous manner by passing the aromatic and cycloolefinic hydrocarbons through a suitable reactor in which they are contacted in the presence of the catalyst, the latter either as a liquid or as a solid, depending upon the catalyst employed in the process. When using mineral acid catalysts such as sulfuric acid, chlorosulfonic acid, or hydrogen fluoride, this catalytic material is introduced continuously to the reactor which is provided with suitable mixing means and the resultant product is then separated into a hydrocarbon layer and a catalyst layer, the latter being returned to further use in the process while the hydrocarbon layer is washed, dried, and distilled as hereinabove set forth. When a solid catalyst such as silica-alumina, clay, or a supported Friedel-Crafts type catalyst is used as a fixed bed in the reactor, and the aromatic and cycloolefinic hydrocarbons are passed therethrough, the resultant hydrocarbon product requires no washing and drying treatment and may be separated by distillation to separate therefrom unconverted aromatic and cycloolefinic hydrocarbons and to recover the desired indan hydrocarbons.

In order to obtain relatively high yields of indan hydrocarbons by our process, it is necessary to use rather carefully selected hydrocarbon fractions as charging stocks. As already indicated herein, only certain types of aromatic hydrocarbons, namely, those containing particular substituents are utilizable as starting materials to produce indan-type hydrocarbons. Thus isopropyltoluene, secondary butyl toluene, para-diisopropylbenzene, and certain other hydrocarbons react readily with branched chain olefins to form an indan hydrocarbon and a saturated hydrocarbon, the latter having substantially the same carbon skeleton as that of the olefinic hydrocarbon charged to the process. An aromatic hydrocarbon which does not contain the aforementioned disubstitution in para position does not react with a branched chain olefin to give the desired hydrogen transfer reactions. Also an olefin which does not have a branched chain such as is present in trimethylethylene, dihydrolimonene, methylcyclopentane, etc. acts as an alkylating agent for the aromatic hydrocarbon also charged to the process. Accordingly, in order to obtain hydrogen transfer rather than alkylation, it is necessary to use a branched chain olefinic hydrocarbon together with a disubstituted benzene hydrocarbon in which the substituents are in para position and one of said substituents comprises an isopropyl group or other hydrocarbon group in which a tertiary hydrogen is combined with the carbon atom adjacent to the aromatic nucleus.

The hydrocarbon 1,3,3,6 - tetramethyl - 1 - p-tolylindan was also synthesized by the following combination of steps in which toluene and mesityl oxide were condensed in the presence of aluminum chloride and hydrogen chloride to yield 4-methyl-4-p-tolyl-2-pentanone. The latter compound was then reacted with p-tolyl-magnesium bromide to form 4-methyl-2,4-di-p-tolyl-2-pentanol. This methylditolylpentanol was then treated with anhydrous hydrogen fluoride at 0° C. to form 1,3,3,6-tetramethyl-1-p-tolylindan.

1,3,3,6-tetramethyl-1-p-tolylindan was also formed by reacting 1-methyl-4-isopropenylbenzene with itself in the presence of anhydrous hydrogen fluoride. The 1-methyl-4-isopropenylbenzene used as charging stock in the last named reaction was prepared by condensing p-bromotoluene with acetone by the Grignard reaction to form dimethyl-p-tolylcarbinol which was then dehydrated over activated alumina at 350° C. to produce the 1-methyl-4-isopropenylbenzene.

The arylindan formed by the methods indicated above may be hydrogenated catalytically to form cycloalkylperhydroindan hydrocarbons. Any active hydrogenation catalyst may be used to promote the conversion of these arylindan hydrocarbons into the corresponding perhydroindans. Particularly effective catalysts for such hydrogenation treatments comprise the metals and oxides of the metals of Group VIII of the Periodic Table, and preferably the metals cobalt, nickel, palladium and platinum. This hydrogenation treatment is carried out at a temperature of from about 50° to about 300° C. and at a pressure of from substantially atmospheric to about 100 atmospheres, or more.

The following examples are given to illustrate the character of results obtained by the use of specific embodiment of the present invention, although the data presented are not introduced with the intention of restricting unduly the generally broad scope of the invention.

*Example I*

168 grams of anhydrous hydrogen fluoride and 134 grams of para-cymene were introduced into a copper flask provided with a copper stirrer and dropping funnel, said flask being surrounded by a cooling bath of ice and water. 70 grams of trimethylethylene and 134 grams of para-cymene were mixed and the mixture was then added slowly with stirring to the hydrogen fluoride-para-cymene mixture contained in the copper flask. Usually from 1 to 3 hours were required to complete the addition of the trimethylethylene-para-cymene mixture after which the stirring of the reaction mixture was continued for an additional time of 30 minutes, and then the content of the flask was poured into a copper beaker containing ice pre-cooled to about —30° C. The resultant hydrocarbon material was separated, washed with dilute aqueous potassium hydroxide solution, then washed with water, dried over anhydrous calcium chloride and distilled. A total of 308 grams of a hydrocarbon reaction product was charged to such a distillation and separated into the following fractions.

| Fraction Number | Boiling Point, °C. | Refractive Index, $n_D^{20}$ | Weight, Grams |
|---|---|---|---|
| 1 | 28–30 | 1.3540 | 21.4 |
| 2 | 30–165 | 1.4488 | 7.1 |
| 3 | 165–172 | 1.4770 | 44.0 |
| 4 | 172–173 | 1.4891 | 118 |
| 5 | Above 173 | | 117 |

Fraction 1 was found to be isopentane, fraction 2 contained low boiling paraffins, fraction 3 consisted essentially of decane, and fraction 4 consisted of unconverted para-cymene. 106 grams of the higher boiling material (fraction 5) were redistilled at subatmospheric pressure. The following fractions were collected:

| Fraction Number | Boiling Point | | Refractive Index, $n_D^{20}$ | Weight, Grams |
|---|---|---|---|---|
| | °C. | at mm. | | |
| V-1 | 40–70 | 3.5 | 1.4908 | 8.5 |
| V-2 | 70–87 | 3.5 | 1.4940 | 5.0 |
| V-3 | 89–94 | 4.0 | 1.4983 | 10.5 |
| V-4 | 94–96 | 4.0 | 1.5021 | 12.5 |
| V-5 | 90–130 | 3.0 | 1.5050 | 9.0 |
| V-6 | 130–147 | 3.5 | 1.5255 | 11.0 |
| V-7 | 144– | 3.0 | 1.5433 | 4.2 |
| V-8 | 144–146 | 3.0 | 1.5577 | 35.5 |
| V-9 | Above 146 | 3.0 | 1.5520 | 8.0 |

Fraction V-4 corresponded to amyl-p-cymene. Fraction V-6 consisted of a mixture of diamyl-p-cymene and 1,3,3,6-tetramethyl-1-p-tolylindan. Fractions V-8 and V-9 also consisted of 1,3,3,6-tetramethyl-1-p-tolylindan which yielded a tetranitro derivative melting at 248–249° C.

15 grams of 1,3,3,6-tetramethyl-1-p-tolylindan prepared as indicated above were hydrogenated at a temperature of 100° C. and an initial hydrogen pressure of 120 atmospheres and in the presence of 2.5 grams of a nickel-diatomaceous earth catalyst containing about 60% by weight of freshly reduced nickel. From the decrease in hydrogen pressure within the steel hydrogenation autoclave, it was calculated that 6 moles of hydrogen were absorbed per mole of hydrocarbon treated. The resultant hydrogenation product was stable to nitrated mixture indicating complete hydrogenation. The hydrogenated hydrocarbon distilled at 183° C. at a pressure of 13 mm. of mercury, it has a refractive index, $n_D^{20}$, of 1.4982 and a density, $d_4^{20}$, of 0.9248, and consisted of 1,3,3,6-tetramethyl-1-(4-methylcyclohexyl)-hexahydroindan.

*Example II*

1,3,3,6-tetramethyl-1-p-tolylindan synthesized by the following series of steps was also hydrogenated catalytically at 100° C. in the presence of nickel catalyst and an initial hydrogen pressure of 120 atmospheres to give 1,3,3,6-tetramethyl-1-(4-methylcyclohexyl)-hexahydroindan.

108 grams (2 moles) of toluene and 200 grams of carbon disulfide were placed in a 3-necked reaction flask of 2-liter capacity provided with a mercury steel stirrer, a dropping funnel, and a reflux condenser and surrounded by an ice bath. 160 grams (1.2 moles) of aluminum chloride were added to the solution in the reaction flask and a slow stream of hydrogen chloride was bubbled through this solution while simultaneously 98 grams (1 mole) of mesityl oxide was added to the reaction flask over a period of 2.5 hours. After the mesityl oxide was added, the contents of the flask were stirred for an additional time of two hours. Upon standing, two layers separated; the upper consisting of a yellow liquid and the lower of a heavy red sludge. The content of the flask was poured into ice. The upper layer (organic layer) was separated; it was washed with water, sodium carbonate solution and again with water. The product was steam distilled to remove the excess of toluene and carbon disulfide; and the remaining material was separated from the water, dried, and distilled under reduced pressure. Fraction (1) B. P. 35–51°/37 mm., $n_D^{20}$ 1.4776, 20.3 g.; (2) B. P. 51–134°/37 mm., $n_D^{20}$ 1.4620, 2.2 g.; (3) 134–160°/37 mm., $n_D^{20}$ 1.5180, 20.8 g.; (4) 160°/37 mm., $n_D^{20}$ 1.5082, 75.5 g.; (5) 105–147°/4 mm., $n_D^{20}$ 1.5153, 2.3 g.; (6) residue 20.4 g.

Yield of 4-methyl-4-p-tolyl-2-pentanone (fraction 4) 40%, $d_4^{20}$ 0.9594.

Anal. calcd. for $C_{13}H_{18}O$: C, 82.11; H, 9.47. Found: C, 82.15; H, 9.37.

19 grams (0.1 mole) of the 4-methyl-4-p-tolyl-2-pentanone were condensed with 21 grams (.12 mole) of p-tolylmagnesium bromide to form 18 grams of 4-methyl-2,4-di-p-tolyl-2-pentanol which distilled at 160° C. at a pressure of 3 mm. of mercury, had a refractive index $n_D^{20}$ of 1.5520, and contained 85.1% by weight of carbon and 9.17% by weight of hydrogen, these values corresponding closely to the 85.11% by weight of carbon and 9.22% of hydrogen calculated for the formula $C_{20}H_{26}O$.

6 grams of the 4-methyl-2,4-di-p-tolyl-2-pentanol were dissolved in 15 grams of methylcyclohexane and the solution was added with stirring to 17 grams of anhydrous hydrogen fluoride contained in a copper flask at a temperature of 0° C. The contents of the copper flask was then poured onto ice and the hydrocarbon layer which separated was washed with potassium hydroxide and water, and then dried over calcium chloride and distilled to give 3 grams of 1,3,3,6-tetramethyl-1-p-tolylindan which boiled at 161° C. at a pressure of 7.5 mm. of mercury and had a refractive index, $n_D^{20}$, of 1.5579.

*Example III*

A 66% yield of dimethyl-p-tolylcarbinol was prepared by reacting 256 grams (1.5 moles) of p-bromotoluene and 81 grams (1.4 moles) of acetone by a Grignard reaction. The dimethyl-p-tolylcarbinol distilled at a temperature of 73° C. at a pressure of 2.5 mm. of mercury and had a refractive index, $n_D^{20}$, of 1.5168.

43 grams of the dimethyl-p-tolylcarbinol were passed over 40 cc. of 10–12 mesh activated alumina maintained at a temperature of 350° C. while charging the carbinol at an hourly liquid space velocity of 1. The 1-methyl-4-isopropenylbenzene was thus obtained in yield of 80% of the theoretical. It had a boiling point of 82° C. at a pressure of 21 mm. of mercury, and a refractive index, $n_D^{20}$, of 1.5350.

8 grams of the resultant 1-methyl-4-isopropenylbenzene were dissolved in 7 grams of methylcyclohexane and the solution was added with agitation to 10 cc. of anhydrous hydrogen fluoride contained in a copper beaker. The resultant reaction mixture was stirred for 15 minutes and then poured into 15 grams of ice pre-cooled to −40° C. The hydrocarbon layer was separated, diluted with ether, washed with aqueous potassium hydroxide solution, and then dried and distilled. Three grams of hydrocarbon material was obtained, boiling at 171° C. at a pressure of 5 mm. of mercury, and having a refractive index, $n_D^{20}$, of 1.5545 and a melting point of 33° C. According to ultraviolet absorption analysis, this hydrocarbon material consisted of 1,3,3,6-tetramethyl-1-p-tolylindan, and was found by analysis to contain 91.03% by weight of carbon and 9.11% by weight of hydrogen. These analytical values correspond closely to the composition calculated for $C_{20}H_{24}$, namely, 90.85% by weight of carbon and 9.15% by weight of hydrogen.

Catalytic hydrogenation of 1,3,3,6-tetramethyl-1-p-tolylindan in the presence of 10% by weight of a nickel-Kieselguhr catalyst at a temperature of 125° C. and at an initial hydrogen pressure of 115 atmospheres yielded 1,3,3,6-tetramethyl-1-(4-methylcyclohexyl)-hexahydroindan boiling at 183° C. at 13 mm. pressure.

We claim as our invention:

1. A process for producing a cycloalkylperhydroindan hydrocarbon which comprises effecting a hydrogen transfer reaction in the presence of an acid-acting catalyst between a branched chain olefin and a para-di-substituted aromatic hydrocarbon having as one substituent a hydrocarbon group containing only one hydrogen atom joined to the carbon atom combined with the aromatic ring to form an arylindan hydrocarbon, hydrogenating said arylindan hydrocarbon to a cycloalkylperhydroindan hydrocarbon and recovering said cycloalkylperhydroindan hydrocarbon.

2. A process for producing a cyclohexylperhydroindan hydrocarbon which comprises effecting a hydrogen transfer reaction in the presence of an acid-acting catalyst between a branched chain olefin and a para-di-substituted benzene hydrocarbon having as one substituent a hydrocarbon group containing only one hydrogen atom joined to the carbon atom combined with the benzene ring to form a phenylindan hydrocarbon, hydrogenating said phenylindan hydrocarbon to a cyclohexylperhydroindan hydrocarbon, and recovering said cyclohexylperhydroindan hydrocarbon.

3. A process for producing a cycloalkylperhydroindan hydrocarbon which comprises effecting a hydrogen transfer reaction in the presence of a mineral acid catalyst at a temperature of from about −30° to about 100° C. between a branched chain olefin and a para-di-substituted aromatic hydrocarbon having as one substituent a hydrocarbon group containing only one hydrogen atom joined to the carbon atom combined with the aromatic ring to form an arylindan hydrocarbon, reacting said arylindan with hydrogen in the presence of a hydrogenation catalyst at a temperature of from about 50° to about 300° C. to form a cycloalkylperhydroindan hydrocarbon, and recovering said cycloalkylperhydroindan hydrocarbon.

4. A process for producing a cyclohexylperhydroindan hydrocarbon which comprises effecting a hydrogen transfer reaction in the presence of a mineral acid catalyst at a temperature of from about −30° to about 100° C. between a branched chain olefin and a para-di-substituted benzene hydrocarbon having as one substituent a hydrocarbon group containing only one hydrogen atom joined to the carbon atom combined with the phenyl ring to form a phenylindan hydrocarbon, reacting said phenylindan with hydrogen in the presence of a hydrogenation catalyst at a temperature of from about 50° to about 300° C. to form a cyclohexylperhydroindan hydrocarbon, and recovering said cyclohexylperhydroindan hydrocarbon.

5. A process for producing a cyclohexylperhydroindan hydrocarbon which comprises effecting a hydrogen transfer reaction in the presence of a mineral acid catalyst at a temperature of from about −30° to about 100° C. between a branched chain olefin and a para-di-substituted benzene hydrocarbon having as one substituent a hydrocarbon group containing only one hydrogen atom joined to the carbon atom combined with the phenyl ring to form a phenylindan hydrocarbon, reacting said phenylindan with hydrogen in the presence of a hydrogenation catalyst at a temperature of from about 50° to about 300° C. and at a pressure of from substantially atmospheric to about 100 atmospheres to form a cyclohexylperhydroindan hydrocarbon, and recovering said cyclohexylperhydroindan hydrocarbon.

6. The process defined in claim 4 further characterized in that said hydrogenation catalyst comprises a nickel catalyst.

7. A process for producing 1,3,3,6-tetramethyl-1-(4-methylcyclohexyl)-hexahydroindan which comprises effecting a hydrogen transfer reaction in the presence of a mineral acid catalyst at a temperature of from about −30° to about 100° C. between a branched chain olefin and p-cymene to form 1,3,3,6-tetramethyl-1-p-tolylindan, reacting said 1,3,3,6-tetramethyl-1-p-tolylindan with hydrogen in the presence of a hydrogenation catalyst at a temperature of from about 50° to about 300° C. to form 1,3,3,6-tetramethyl-1-(4-methylcyclohexyl)-hexahydroindan, and recovering said 1,3,3,6-tetramethyl-1-(4-methylcyclohexyl)-hexahydroindan.

8. The process defined in claim 7 further characterized in that said mineral acid catalyst comprises substantially anhydrous hydrogen fluoride.

9. The process defined in claim 7 further characterized in that said hydrogenation catalyst comprises a nickel catalyst.

10. The process defined in claim 7 further characterized in that said branched chain olefin comprises trimethylethylene.

11. The process defined in claim 7 further characterized in that said branched chain olefin comprises methylcyclohexene.

12. 1,3,3,6 - tetramethyl - 1 - (4 - methylcyclohexyl) - hexahydroindan.

13. A 1,3,3,6 - tetraalkyl-1-cycloalkyl - hexahydroindan.

14. A 1,3,3,6 - tetramethyl - 1 - cycloalkylhexahydroindan.

15. 1,3,3,6 - tetramethyl - 5 - isopropyl - 1 - (4-methyl - 3 - isopropyl - cyclohexyl) - hexahydroindan.

16. 1,3,3,6 - tetramethyl - 5 - cyclohexyl - 1 - (4 - methyl - dicyclohexyl) - hexahydroindan.

VLADIMIR N. IPATIEFF.
HERMAN PINES.

REFERENCES CITED

The following references are of record in the file of this patent:

Plattner et al., C. A., 41, 2027a.
Richards et al., J. A. C. S., 63, 1320–5 (1941).